Sept. 13, 1955   C. M. HARTWICK   2,717,935
SAFETY DEVICE FOR HYDRAULIC BRAKES
Filed May 26, 1952

INVENTOR
CHARLES M. HARTWICK
BY Joseph K. Schofield
ATTORNEY

United States Patent Office 2,717,935
Patented Sept. 13, 1955

2,717,935

SAFETY DEVICE FOR HYDRAULIC BRAKES

Charles Milton Hartwick, Avon, Conn.

Application May 26, 1952, Serial No. 290,100

3 Claims. (Cl. 200—84)

The present invention relates to a safety device for hydraulic brakes adapted primarily for automobile vehicles. More particularly the invention relates to an electric switch mounted on a plug adapted to be inserted within the master cylinder of a hydraulic braking system for automobiles. This switch is connected to the electrical circuit of the automobile ignition system to warn the driver, or stop the car, in case of a serious loss of brake fluid.

It has been proposed to construct the master cylinder of hydraulic brake systems in such a manner that an auxiliary equalizing piston may be incorporated therein; if this piston should be moved into one, or the other extreme position due to loss of brake fluid from a line extending from the one, or other side thereof, this piston would then engage an electrical contact, thereby completing a warning circuit to warn the driver of a faulty brake line.

It is an object of the present invention to incorporate a warning system in the hydraulic braking systems of cars, without disturbing the braking system in any way.

It is a further object of the invention to provide a warning system which will be operated by the amount of brake fluid contained in the master cylinder and which will warn the driver of the car when the fluid level drops to a predetermined, dangerous level.

Another object of the invention is to provide an electrical switch operable by change in fluid level in the master cylinder, which may be easily manufactured, will be sturdy and dependable in operation, and which can be easily installed in any vehicle having a hydraulic braking system, without disturbing the braking system in any way, and without requiring any extensive changes in the electrical system of the car.

In accordance with the present invention, I provide a special plug adapted to be inserted within the existing filler opening of the master cylinder for the brake system to replace the existing plug. This special plug has mounted therein a float, which is movable between a high, normal position (corresponding to a full brake fluid reservoir), and a lower, or warning position (when the brake fluid level drops due to a break in a fluid line, excessive leakage, etc.). The plug has mounted thereon an electrical contact which is insulated from the master cylinder and operatively associated with the float and connected to the electrical system of the car, so that, when the float falls in the master cylinder due to a substantial loss of brake fluid, an electrical circuit will be opened or closed to warn the driver of loss of fluid, or serving to stop the car entirely.

The invention also contemplates the use of guiding means for the float, mounted on the plug. These guiding means may be in the form of a cage extending from the plug into the fluid and guiding the operation of the float in a predetermined direction, regardless of the position of the car, be it level, or on a slope.

It is a feature of the invention also that the electrical circuit may be so connected that the primary, or low tension side of the ignition coil of the car is shorted directly to ground, i. e. to the chassis of the car, or that an indicator circuit may be employed, without any change in the structure of the replacement plug containing the electrical switch. According to another feature of the invention, the switch is of the normally closed type, the ignition circuit being opened upon loss of brake fluid.

If the electrical circuit including the switch mounted on the plug is connected into the ignition circuit of the car to render the same inoperative, loss of brake fluid will first cause the motor to skip, and then eventually to completely stop the engine. Since the motor will not stop or fail immediately, the driver is forewarned of trouble in the braking system by the intermittent action of the engine. A sudden application of the brakes, causing further withdrawal of braking fluid from the master cylinder reservoir, will then cause the contacts to close (or open) definitely, thereby stopping the engine by rendering the ignition system completely inoperative. When the reservoir is filled again the ignition system will again become operative without any further attention being given to the safety device. For emergency driving, the safety device can be readily rendered inoperative, by the connection (or removal) of but one wire which is accessible upon raising the hood.

The novel features which are considered as characteristic for the present invention are set forth in particular in the appended claims; the invention itself, however, both as to its construction and its method of operation, together with additional objects and advantages thereof, will best be understood from the following description of specific embodiments when read in connection with the accompanying drawing, in which Fig. 1 is a longitudinal sectional view through the reservoir portion of the master cylinder of a hydraulic braking system of an automobile, a part only of the master cylinder being shown;

Figure 1:
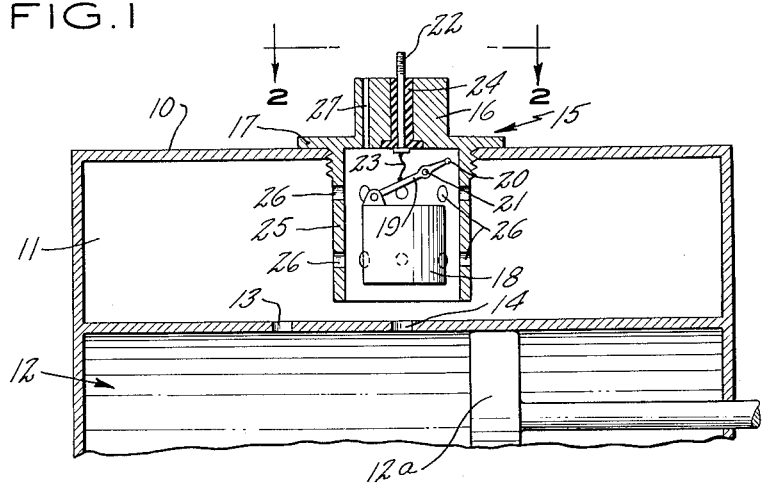

Referring to the drawings, and in particular to Fig. 1, 10 indicates the top portion of the master cylinder of a hydraulic braking system for automobiles and 11 is the fluid reservoir chamber contained therein. A part of the master cylinder 12 is shown in which the master piston 12–a for operating the brakes is disposed. The usual compensating port is shown at 13, and a breather hole communicating with the space for the master piston is shown at 14. The main filler plug 15 for the master cylinder is threaded into an opening in the top portion 10.

The filler plug 15 is provided with an upstanding portion 16, which may be of square, or hexagonal shape, to permit application of a wrench. A flange 17 is disposed below the upstanding portion, which flange bears against the top of the master cylinder portion 10 to seal the same against entry of dirt, and escape of fluid. A float 18 is mounted on the filler plug 15. As illustrated in Fig. 1, this float 18 is secured to the plug 15 by means of a link 19, connected to the float at one end thereof, and pivoted to the body of the plug 15 at an intermediate point 21. The link 19 has a free end, which carries a contact 20 electrically connected to the wire 23. A connection, or terminal stud 22 is mounted on the plug 15 and insulated therefrom, for example by means of a bushing 24 of rubber, or plastic material and the small lead wire 23 connects the terminal stud 22 to the contact 20 and to the plug when the float moves downward enough to move the contact 20 into engagement with the plug.

The filler plug 15 is provided with a vent hole 27 in the usual manner. The plug 15 may be formed with a cylindrical, hollow depending portion 25, having openings 26 therein to permit free circulation of brake fluid through and about the depending portion. This portion 25 will form a loose fitting guide for the float 18. It will be noted that upon a lowering of the level of the brake fluid contained in the chamber 11, the float will drop. This movement will cause the link 19 to pivot about its fixed pivot point 21, and the free end of the link, carrying the contact 20 will move upward toward the filler plug 15, eventually contacting the same. If the filler plug is made of a conducting material, such as iron, or aluminum, an electrical contact will be closed, completing a circuit from the terminal stud 22, through wire 23, contact 20 to ground (i. e. the chassis of the car). The further connection of this circuit will be explained in more detail below.

Figure 4:
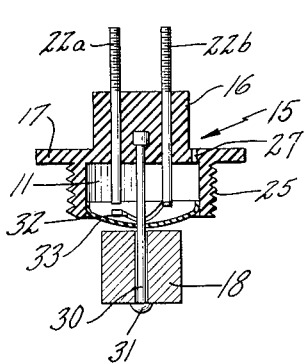
Fig. 4 is a vertical cross sectional view showing another embodiment of a plug.
Figure 2:
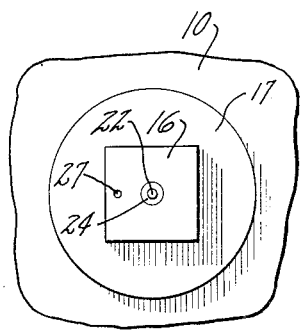
Fig. 2 is a plan view of the plug shown in Fig. 1.

Fig. 4 illustrates an embodiment of the invention employing two terminal studs, insulated one from the other. In this case the plug 15 is preferably made entirely of insulating material, such as plastic, "Bakelite," hard rubber, or the like. A central guide stud 30, having an enlarged lower end 31 to prevent loss of the float 18, preferably may be provided, embedded in the top portion 16 of the filler plug. The depending portion 25, carrying the threads on the outside, by means of which the plug may be secured in the master cylinder, is preferably closed off at the bottom by means of a flexible diaphragm 33. The terminal studs 22–a and 22–b extend into the space formed by the portion 25 and the diaphragm; one of these terminal studs (here shown the stud 22–b) carries a flexible contact member 32 adapted to engage the other terminal stud. The operation of this device is —electrically— the reverse of the one illustrated in Fig. 2, since the contact is normally closed, and will open only upon a drop in the level of the brake fluid to a dangerous point. The purpose of the diaphragm is to exclude any brake fluid from the contacts. Since the usual brake fluid employed is an oily substance, and acts as an insulator, it is advantageous to keep the electrical contacts free from contact with the brake fluid.

The operation of the safety device will now be explained with reference to Fig. 3 of the accompanying drawing. This figure shows in general the conventional ignition circuit of an automobile, where a secondary, or high-tension side S of the ignition coil is connected to the distributor arm of the distributor D. The car battery is indicated at B, the positive side being grounded to the chassis of the car as commonly connected; of course the polarity of the battery connection is immaterial as far as the operation of the safety device is concerned. The negative side of the battery B is connected to one side of the primary P of the ignition coil; the other side of the ignition coil is connected to the breaker contacts I of the distributor having a condenser C in parallel therewith, and then back to the chassis of the car.

The plug illustrated in Fig. 1, and having a normally open contact, may be connected at the "line" side of the distributor-breaker contacts, by means of a wire 40 secured to the terminal stud 22. The other side of this branch circuit will be grounded through the metallic plug 15, and the master cylinder 10 secured to the car. When the fluid level in the master cylinder reservoir 11 drops to a dangerously low level, due to a leak in the braking system, or for some other cause, the float will drop causing gradual engagement of contact 20 with the plug 15, and resulting in the shorting out of the breaker circuit. This will cause the motor, first to skip and eventually to stop entirely. The period during which the motor will still operate, though improperly and intermittently, will be enough to warn the driver but will permit him to drive the car a short distance. A sudden application of the brakes (causing further withdrawal of fluid from the reservoir) may cause the motor to stall entirely, aiding the weakened brakes in their function. If it is desired to drive the car, relying on the hand brake alone, the wire 40 may temporarily be removed from either of its connections (the one at the distributor end being readily accessible) and the motor will function normally again.

Figure 3:
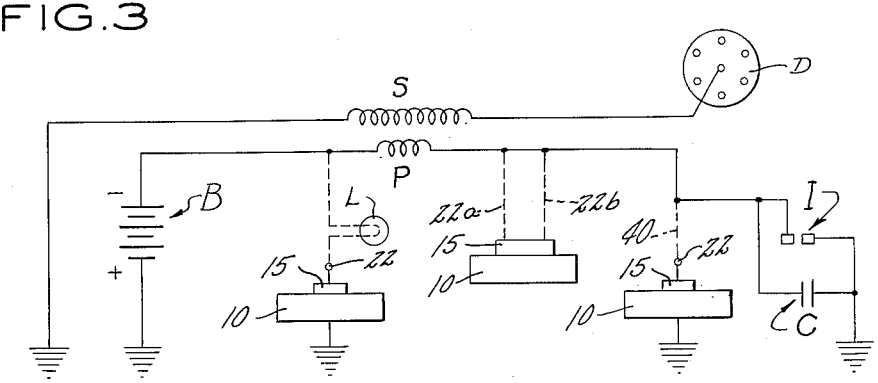
Fig. 3 is a circuit diagram showing, diagrammatically, several ways of connecting the safety device.

The connection of the plug 15 illustrated in Fig. 3 is shown in dotted lines in any one of several positions of the circuit. The connection of the second terminal of the ignition coil is then broken at the point X and the terminal studs 22–a and 22–b placed in series with this line. The contacts inside the plug will be closed so long as the fluid level in the master brake cylinder reservoir 11 is at a safe height; upon dropping of the fluid level, the float will also drop, permitting contact 32 to open. Due to the motion of the car and the vibration of the engine, this opening of the contacts will not be sudden but gradual, causing the motor to skip as before, thus warning the driver. By connecting the two terminals 22–a and 22–b together on the outside will permit operation of the car under emergency conditions.

The device illustrated in Fig. 3 may also be employed to give a warning indication to the driver by means of a separate indicating device, such as a bell, or a lamp (indicated at L in Fig. 3). In this case, the lamp, or bell is connected on one side to the negative side of the car battery; while the other terminal thereof is connected to the normally open contact through stud 22. The circuit is completed, when the brake fluid level drops, through the master cylinder to the chassis, thereby giving an audible, or visual indication to the driver, of impending brake failure.

It will be understood that each of the elements described above, or two or more together, may also find a useful application in other types of safety or signalling devices operated by change in fluid levels differing from the types described above.

While the invention has been illustrated and described as embodied in a safety device for hydraulic brakes, it is not intended to be limited to the details shown, since various modifications and structural and electrical circuit changes may be made. The invention may be adapted to various applications without omitting features that, from the standpoint of prior art, fairly constitute essential characteristics of the generic or specific aspects thereof and, therefore, such adaptations should and are intended to be comprehended within the meaning and range of equivalence of the following claims.

I claim as my invention:

1. In a safety device for automotive vehicles having hydraulic brakes, a plug adapted to be secured within an opening of a vessel containing fluid for said brakes, said plug having a pair of electrical contact members passing therethrough and insulated from each other, said contacts constituting a part of the ignition system for said vehicle, one of said contact members being formed as a contact spring; and a float movably mounted on said plug and operatively associated with said contact spring to actuate the same upon change of position of said float, whereby when the float is in a predetermined position the ignition system is rendered inoperative.

2. In a safety device for automotive vehicles having hydraulic brakes, a plug according to claim 1, consisting entirely of insulating material, and provided with a depending substantially cylindrical portion extending axially of the plug, said portion being formed integral therewith, and a flexible diaphragm extending transverse of the depending portion adjacent the free end thereof and movably retained by said depending portion.

3. In a safety device for automotive vehicles having hydraulic brakes, a plug according to claim 1, consisting of insulating material, said plug being provided with a depending portion fitting closely within the filling opening of a tank for fluids, said portion having a pair of electrical contact members passing therethrough and separated from each other, one of said contact members having a resiliently movable contact point normally maintained in its open position, and a float movable vertically with varying levels of liquid and moving said movable contact into contact with the other contact when said vessel is filled with liquid.

References Cited in the file of this patent

UNITED STATES PATENTS

| | | |
|---|---|---|
| 1,222,183 | Cohen | Apr. 10, 1917 |
| 1,252,912 | McBride et al. | Jan. 8, 1918 |
| 1,323,113 | Sprangers | Nov. 25, 1919 |
| 2,085,173 | Stansbury | June 29, 1937 |
| 2,494,802 | Fox | Jan. 17, 1950 |